United States Patent

Erdtmann et al.

[11] Patent Number: 6,153,000
[45] Date of Patent: Nov. 28, 2000

[54] COLOR PIGMENTED INK JET INK SET

[75] Inventors: David Erdtmann, Rochester; Alexandra Bermel, Pittsford; Thomas Kocher, Rochester, all of N.Y.

[73] Assignee: Eastman Kodak Company, Rochester, N.Y.

[21] Appl. No.: 09/351,614

[22] Filed: Jul. 12, 1999

[51] Int. Cl.⁷ .................................................. C09D 11/02
[52] U.S. Cl. .................. 106/31.6; 106/31.77; 106/31.78
[58] Field of Search ................................ 106/31.6, 31.77, 106/31.78

[56] References Cited

U.S. PATENT DOCUMENTS

| | | | |
|---|---|---|---|
| 4,311,775 | 1/1982 | Regan | 430/37 |
| 4,818,285 | 4/1989 | Causley et al. | 106/31.27 |
| 5,679,139 | 10/1997 | McInerney et al. | 106/31.6 |
| 5,738,716 | 4/1998 | Santilli et al. | 106/31.77 |
| 5,846,306 | 12/1998 | Kubota et al. | 106/31.75 |
| 5,993,527 | 11/1999 | Tochihara et al. | 106/31.78 |
| 5,994,427 | 11/1999 | Kappele et al. | 106/31.6 |
| 6,039,796 | 3/2000 | Kubota et al. | 106/31.6 |
| 6,075,069 | 6/2000 | Takemoto | 106/31.6 |

*Primary Examiner*—Helene Klemanski
*Attorney, Agent, or Firm*—Harold E. Cole

[57] ABSTRACT

A color ink jet ink set for color printing; comprising
(a) a first ink comprising a carrier and a copper phthalocyanine pigment as a cyan colorant;
(b) a second ink comprising a carrier and a quinacridone pigment as a magenta colorant; and
(c) a third ink comprising a carrier and Pigment Yellow 155 as a yellow colorant.

14 Claims, No Drawings

COLOR PIGMENTED INK JET INK SET

CROSS REFERENCE TO RELATED APPLICATION

Reference is made to commonly-assigned copending U.S. patent application Ser. No. 09/300,829, filed Apr. 27, 1999, entitled "Color Pigmented Ink Jet Ink Sets", of Erdtmann et al; the teachings of which are incorporated herein by reference.

FIELD OF THE INVENTION

This invention relates to the field of ink jet printing, particularly color printing.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

U.S. Pat. No. 5,738,716 relates to a color pigmented ink jet ink set comprising a bridged aluminum phthalocyanine pigment, Pigment Red 122, Pigment Yellow 74, and Pigment Black 7. However, there is a problem with this ink jet ink set in that the inks fade under typical outdoor weather conditions. It is an object of this invention to provide an ink jet ink set which exhibits both superior outdoorfastness and lightfastness.

SUMMARY OF THE INVENTION

This and other objects are achieved in accordance with the present invention comprising a color ink jet ink set for color printing; comprising
  (a) a first ink comprising a carrier and a copper phthalocyanine pigment as a cyan colorant;
  (b) a second ink comprising a carrier and a quinacridone pigment as a magenta colorant; and
  (c) a third ink comprising a carrier and Pigment Yellow 155 as a yellow colorant.

Another embodiment of the invention relates to an ink jet printing method for printing color images, comprising the steps of:
  providing an ink jet printer that is responsive to digital data signals;
  loading the printer with ink receptive substrates;
  loading the printer with an color ink jet ink set as described above;
and printing on the ink receptive substrates in response to the digital data signals.

DETAILED DESCRIPTION OF THE INVENTION

Pigments referred to by pigment numbers are numbers assigned by Color Index. In a preferred embodiment of the invention, Pigment Black 7 can be added to further increase the available color gamut of this ink set.

Any quinacridone pigment may be used in the invention such as Pigment Violet 19 or Pigment Red 122. In a preferred embodiment of the invention, Pigment Red 122 is employed as disclosed, for example, in U.S. Pat. No. 5,679,139, the disclosure of which is hereby incorporated by reference.

Any copper phthalocyanine pigment may be used in the invention as a cyan colorant. There may be used, for example, Pigment Blue 15; Pigment Blue 15:1; Pigment Blue 15:2; Pigment Blue 15:3; Pigment Blue 15:4; Pigment Blue 15:6; Pigment Green 7 and Pigment Green 36. In a preferred embodiment of the invention, Pigment Blue 15:3 is employed as disclosed in U.S. Pat. No. 5,679,142 and 5,738,716, the disclosures of which are hereby incorporated by reference.

The process of preparing inks from pigments commonly involves two steps: (a) a dispersing or milling step to break up the pigment to the primary particle, and (b) dilution step in which the dispersed pigment concentrate is diluted with a carrier and other addenda to a working strength ink. In the milling step, the pigment is usually suspended in a carrier (typically the same carrier as that in the finished ink) along with rigid, inert milling media. Mechanical energy is supplied to this pigment dispersion, and the collisions between the milling media and the pigment cause the pigment to deaggregate into its primary particles. A dispersant or stabilizer, or both, is commonly added to the pigment dispersion to facilitate the deaggregation of the raw pigment, to maintain colloidal particle stability, and to retard particle reagglomeration and settling.

There are many different types of materials which may be used as milling media, such as glasses, ceramics, metals, and plastics. In a useful embodiment, the grinding media can comprise particles, preferably substantially spherical in shape, e.g., beads, consisting essentially of a polymeric resin.

In general, polymeric resins suitable for use as milling media are chemically and physically inert, substantially free of metals, solvent and monomers, and of sufficient hardness and friability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), polycarbonates, polyacetals, such as Derlin®, vinyl chloride polymers and copolymers, polyurethanes, polyamides, poly (tetrafluoroethylenes), e.g., Teflon®, and other fluoropolymers, high density polyethylenes, polypropylenes, cellulose ethers and esters such as cellulose acetate, poly(hydroxyethylmethacrylate), poly (hydroxyethyl acrylate), silicone containing polymers such as polysiloxanes and the like. The polymer can be biodegradable. Exemplary biodegradable polymers include poly (lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly (phosphazenes). The polymeric resin can have a density from 0.9 to 3.0 g/cm$^3$. Higher density resins are especially useful inasmuch as it is believed that these provide more efficient particle size reduction. Especially useful are crosslinked or uncrosslinked polymeric media based on styrene.

Milling can take place in any suitable grinding mill. Suitable mills include an airjet mill, a roller mill, a ball mill, an attritor mill and a bead mill. A high speed mill is particularly useful.

By high speed mill is meant milling devices capable of accelerating milling media to velocities greater than about 5 meters per second. The mill can contain a rotating shaft with one or more impellers. In such a mill the velocity imparted to the media is approximately equal to the peripheral velocity of the impeller, which is the product of the impeller revolutions per minute, π, and the impeller diameter. Sufficient milling media velocity is achieved, for example, in a Cowles-type saw tooth impeller having a diameter of 40 mm when operated at 9,000 rev/min. Useful proportions of the milling media, the pigment, the liquid dispersion medium and dispersant can vary within wide limits and depends, for example, upon the particular material selected and the size and density of the milling media etc. The process can be carried out in a continuous or batch mode.

BATCH MILLING

A slurry of<100 μm milling media, liquid, pigment and dispersant is prepared using simple mixing. This slurry may be milled in conventional high energy batch milling processes such as high speed attritor mills, vibratory mills, ball mills, etc. This slurry is milled for a predetermined length of time to allow comminution of the active material to a minimum particle size. After milling is complete, the dispersion of active material is separated from the grinding media by a simple sieving or filtration.

CONTINUOUS MEDIA RECIRCULATION MILLING

A slurry of <100 μm milling media, liquid, pigment and dispersant may be continuously recirculated from a holding vessel through a conventional media mill which has a media separator screen adjusted to >100 μm to allow free passage of the media throughout the circuit. After milling is complete, the dispersion of active material is separated from the grinding media by simple sieving or filtration.

With either of the above modes, the useful amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink jet inks, the pigment is usually present in the mill grind at about 1 to about 50 weight %, excluding the milling media. The weight ratio of pigment to dispersant is 20:1 to 1:2. The high speed mill is a high agitation device, such as those manufactured by Morehouse-Cowles, Hockmeyer et al.

The dispersant is another important ingredient in the mill grind. Useful dispersants for aqueous ink jet inks include sodium dodecyl sulfate, acrylic and styrene-acrylic copolymers, such as those disclosed in U.S. Pat. Nos. 5,085,698 and 5,172,133, and styrenics, such as those disclosed in U.S. Pat. No. 4,597,794. Other patents referred to above in connection with pigment availability also disclose a wide variety of useful dispersants. The dispersant used in the examples is sodium N-methyl-N-oleoyl taurate (OMT).

The milling time can vary widely and depends upon the pigment, mechanical means and residence conditions selected, the initial and desired final particle size, etc. For aqueous mill grinds using the useful pigments, dispersants, and milling media described above, milling times will typically range from 1 to 100 hours. The milled pigment concentrate is preferably separated from the milling media by filtration.

The aqueous carrier medium is water or a mixture of water and at least one water miscible co-solvent. Selection of a suitable mixture depends on requirements of the specific application, such as desired surface tension and viscosity, the selected pigment, drying time of the pigmented ink jet ink, and the type of paper onto which the ink will be printed. Representative examples of water-miscible co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, tetraethylene glycol, propylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, diethylene glycol mono-butyl (or -ethyl) ether, propylene glycol mono-methyl (or -ethyl) ether, poly(ethylene glycol) butyl ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide, 2,2'-thiodiethanol, and tetramethylene sulfone.

INK PREPARATION

In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.1 to 10%, preferably approximately 0.1 to 5%, by weight of the total ink composition for most thermal ink jet printing applications. If an inorganic pigment is selected, the ink will tend to contain higher weight percentages of pigment than with comparable inks employing organic pigments, and may be as high as approximately 75% in some cases, since inorganic pigments generally have higher specific gravities than organic pigments.

The amount of aqueous carrier medium is in the range of approximately 70 to 98 weight %, preferably approximately 90 to 98 weight %, based on the total weight of the ink. A mixture of water and a polyhydric alcohol, such as diethylene glycol, is useful as the aqueous carrier medium. In a preferred embodiment, the inks contain from about 5 to about 60 weight % of water miscible organic solvent. Percentages are based on the total weight of the aqueous carrier medium.

Jet velocity, separation length of the droplets, drop size and stream stability are greatly affected by the surface tension and the viscosity of the ink. Pigmented ink jet inks suitable for use with ink jet printing systems should have a surface tension in the range of about 20 dynes/cm to about 60 dynes/cm and, more preferably, in the range 30 dynes/cm to about 50 dynes/cm. Control of surface tensions in aqueous inks is accomplished by additions of small amounts of surfactants. The level of surfactants to be used can be determined through simple trial and error experiments. Anionic and cationic surfactants may be selected from those disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3 M.

Acceptable viscosities are no greater than 20 centipoise, and preferably in the range of about 1.0 to about 10.0, preferably 1.0 to 5.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

Other ingredients are also commonly added to ink jet inks. A humectant, or co-solvent, is commonly added to help prevent the ink from drying out or crusting in the orifices of the printhead. A penetrant may also be optionally added to help the ink penetrate the receiving substrate, especially when the substrate is a highly sized paper. A biocide, such as Proxel® GXL from Zeneca Colours may be added at a concentration of 0.05–0.5 weight percent to prevent unwanted microbial growth which may occur in the ink over time. Additional additives which may optionally be present in ink jet inks include thickeners, pH adjusters, buffers, conductivity enhancing agents, anti-kogation agents, drying agents, and defoamers.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

Ink jet inks of the present invention can be used in any of the popular ink jet printing systems, including thermal or piezoelectric drop-on-demand printers and continuous ink jet printers. Of course, the specific ink formulations will vary depending upon the type of ink jet printing system.

The following examples are provided to further illustrate the invention.

| Ink 1 Mill Grind | |
|---|---|
| Polymeric beads, mean diameter of 50 μm (milling media) | 325.0 g |
| Black Pearls 880 (Pigment Black 7) from Cabot Chemical Company | 30 g |
| Oleoyl methyl taurine, (OMT) potassium salt | 10.5 g |
| Deionized water | 209.5 g |
| Proxel GXL ® (biocide from Zeneca) | 0.2 g |

The above components were milled in a 2 liter double walled vessel obtained from BYK-Gardner using a high energy media mill manufactured by Morehouse-Cowles Hochmeyer. The mill was run for approximately 8 hours at room temperature. The dispersion was separated from the milling media by filtering the millgrind through a 4–8 μm KIMAX® Buchner Funnel obtained from VWR Scientific Products. An aliquot of the above dispersion to yield 2.15 g pigment was mixed with 21.5 g tri(ethylene glycol), 10.0 g glycerol, 2.5 g di(ethylene glycol) butyl ether, and additional deionized water for a total of 100.0 g. This ink was filtered through a 3-μm filter and introduced into an empty Hewlett-Packard 51626A print cartridge. Images were made with a Hewlett-Packard DeskJet® 540 printer.

PRINTING TEST

Test images comprising patches of varying densities or percentage coverages of the ink, including 100% coverage (Dmax) were printed on a vinyl ink jet paper sold by Eastman Kodak Co. as "Kodak Professional EI Water Resistant Self-Adhesive Vinyl". These images were used to measure outdoorfastness, and densitometry.

LIGHTFASTNESS TEST

Lightfastness was measured by comparing the optical density of the Dmax patch before and after 8 weeks of treatment with a high intensity (50 Klux) xenon lamp, filtered with a piece of window glass to simulate sunlight coming through an office window. One week of exposure under these conditions is approximately equivalent to two weeks under average outdoor ambient conditions.

OUTDOORFASTNESS TEST

Outdoorfastness was measured by comparing the optical density of the Dmax patch before and after treatment with a Q-Panel QUV Accelerated Weathering Tester, Model QUV/spray device using UV Lamps No. UVA-340. A cycle consisting of: 5 minutes spray, 4 hours of condensation at 50° C., and 8 hours UVA exposure at 60° C. was repeated continuously for a total of 1000 hours. Q-Panel recommends this cycle as an accelerated test of average outdoor conditions.

INK 2

A pigmented magenta ink jet ink was prepared and tested like Ink 1 except that the carbon black was replaced with Pigment Red 122, (Sunfast Quinacridone Pigment obtained from Sun Chemical Corporation) and 1.0 g of 2,2-thiodiethanol replaced the di(ethylene glycol) butyl ether.

INK 3

A pigmented yellow ink jet ink was prepared and tested like Ink 1 except that the carbon black was replaced with Pigment Yellow 74 (11-2510 Hansa® Brilliant Yellow 5GX obtained from Hoechst Chemical Co.).

INK 4

A pigmented yellow ink jet ink was prepared and tested like Ink 1 except that the carbon black was replaced with Pigment Yellow 155, (Novaperm® Yellow 4G obtained from Clariant Corp.).

INK 5

A pigmented cyan ink jet ink was prepared and tested like Ink 1 except that the carbon black was replaced with Sunfast Blue 15:3 249–1284 obtained from Sun Chemical Corp.).

INK 6

A pigmented cyan ink jet ink was prepared and tested like Ink 1 except that the carbon black was replaced with a cyan pigment of bridged aluminum phthalocyanine (bis(phthalocyanylalumino)tetraphenyldisiloxane) (Eastman Kodak Co.).

COMPARATIVE INK SET 1

Encad GO® pigmented inks (Pigment Blue 15:3, Pigment Red 122, Pigment Yellow 128, and Carbon Black) were printed on Encad GO® Calendered Vinyl receiver with a Novajet® Pro 600e Model 922 printer and tested in the same manner as Ink 1.

COMPARATIVE INK SET 2

Hewlett-Packard 3500CP UV pigmented inks (Pigment Blue 15:3, Pigment Red 122, Pigment Yellow 128, and Carbon Black) were printed on HP Vinyl C1882A receiver with an Hewlett-Packard Design Jet 3500CP printer and tested in the same manner as Ink 1.

COMPARATIVE INK SET 3

Roland Hi-Fi Jet pigmented inks (Pigment Blue 15:3, Pigment Red 122, Pigment Yellow 74, and Carbon Black) were printed on Roland Vinyl CP1700 receiver and tested in the same manner as Ink 1.

COMPARATIVE INK SET 4

This set comprised inks 1, 2, 3 and 6. This set includes Pigment Yellow 74 and a bridged aluminum phthalocyanine cyan pigment (similar to an ink set in Ser. No.09/300,829, filed Apr. 27, 1999, of Erdtmann et al.)

INVENTION INK SET 1

This set comprised inks 1, 2, 4 and 5. This set includes Pigment Yellow 155 and a copper phthalocyanine cyan pigment.

TABLE 1

Outdoorfastness Testing

| Pigment Set | (% Retention at Dmax) | | | |
|---|---|---|---|---|
| | Cyan | Magenta | Yellow | Black |
| Comparative Ink Set 1 | 80 | 80 | 82 | 99 |
| Comparative Ink Set 2 | 81 | 65 | 6 | 91 |
| Comparative Ink Set 3 | 75 | 48 | 54 | 80 |

TABLE 1-continued

Outdoorfastness Testing

| Pigment Set | (% Retention at Dmax) | | | |
|---|---|---|---|---|
| | Cyan | Magenta | Yellow | Black |
| Comparative Ink Set 4 | 58 | 94 | 76 | 97 |
| Invention Ink Set 1 | 98 | 96 | 84 | 100 |

The above results show that the invention ink set has a higher % density retention than any of the comparative ink sets.

TABLE 2

Lightfastness Test

| Pigment Set | (% Retention at Dmax) | | | |
|---|---|---|---|---|
| | Cyan | Magenta | Yellow | Black |
| Comparative Ink Set 1 | 87 | 89 | 88 | 100 |
| Comparative Ink Set 2 | 95 | 95 | 95 | 100 |
| Comparative Ink Set 4 | 86 | 98 | 80 | 100 |
| Invention Ink Set 1 | 99 | 98 | 100 | 100 |

The above results show that the invention ink set is equal to or has a higher % density retention than any of the comparative ink sets.

The invention has been described in detail with particular reference to useful embodiments thereof, but it will be understood that variations and modifications can be effected within the spirit and scope of the invention.

We claim:

1. A color ink jet ink set for color printing; comprising
   (a) a first ink comprising a carrier and a copper phthalocyanine pigment as a cyan colorant;
   (b) a second ink comprising a carrier and a quinacridone pigment as a magenta colorant; and
   (c) a third ink comprising a carrier and Pigment Yellow 155 as a yellow colorant.

2. The ink jet ink set of claim 1 wherein said quinacridone pigment is Pigment Red 122.

3. The ink jet ink set of claim 1 wherein said copper phthalocyanine pigment is Pigment Blue 15:3.

4. The ink set of claim 1 further comprising Pigment Black 7 as an additional ink.

5. The ink jet set of claim 1 wherein said carrier is water.

6. The ink jet ink set of claim 1 wherein each ink contains 0.1 to 10.0 weight percent of total pigment and the carrier is selected from the group consisting of water and water miscible organic solvents.

7. The ink jet ink set of claim 1 wherein each ink contains from about 5 to about 60 weight percent of water miscible organic solvents.

8. An ink jet printing method for printing color images, comprising the steps of:
   providing an ink jet printer that is responsive to digital data signals;
   loading said printer with ink receptive substrates;
   loading said printer with an color ink jet ink set according to claim 1;
   and printing on said ink receptive substrates in response to said digital data signals.

9. The method of claim 8 wherein said quinacridone pigment is Pigment Red 122.

10. The method of claim 8 wherein said copper phthalocyanine pigment is Pigment Blue 15:3.

11. The method of claim 8 further comprising Pigment Black 7 as an additional ink.

12. The method of claim 8 wherein said carrier is water.

13. The method of claim 8 wherein each ink contains about 0.1 to about 10.0 weight percent of total pigment and the carrier is selected from the group consisting of water and water miscible organic solvents.

14. The method of claim 8 wherein each ink contains from about 5 to about 60 weight percent of water miscible organic solvents.

* * * * *